Sept. 2, 1969  L. S. FLORSHEIM, JR., ET AL  3,464,768
MULTI-SIZE SHEET FILM FEEDING MAGAZINE
FOR PHOTOGRAPHIC APPARATUS
Filed Sept. 30, 1966  3 Sheets-Sheet 1

INVENTORS
Leonard S. Florsheim, Jr.
Frederick W. Hacker
BY Hill, Sherman, Meroni, Gross & Simpson
ATTORNEYS

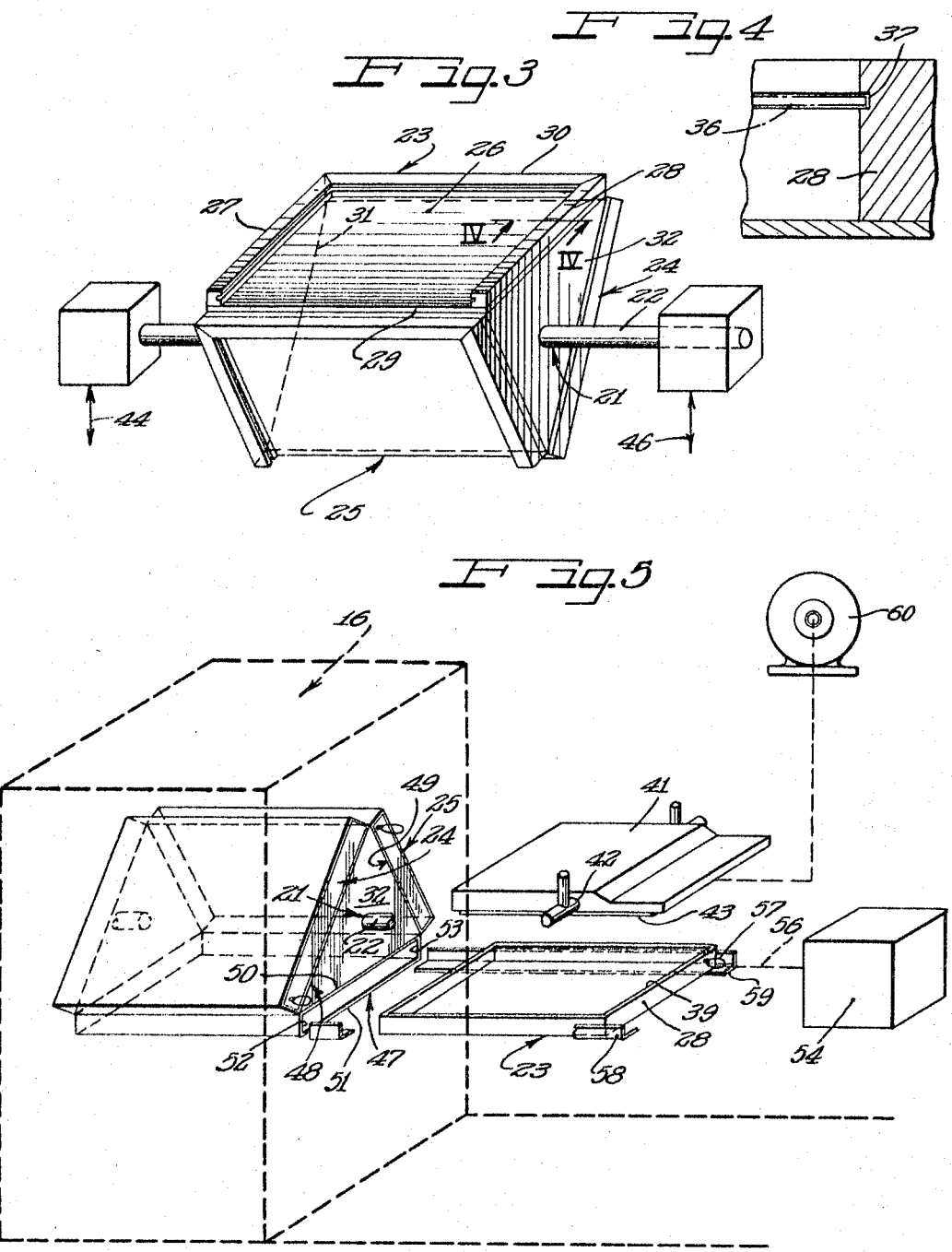

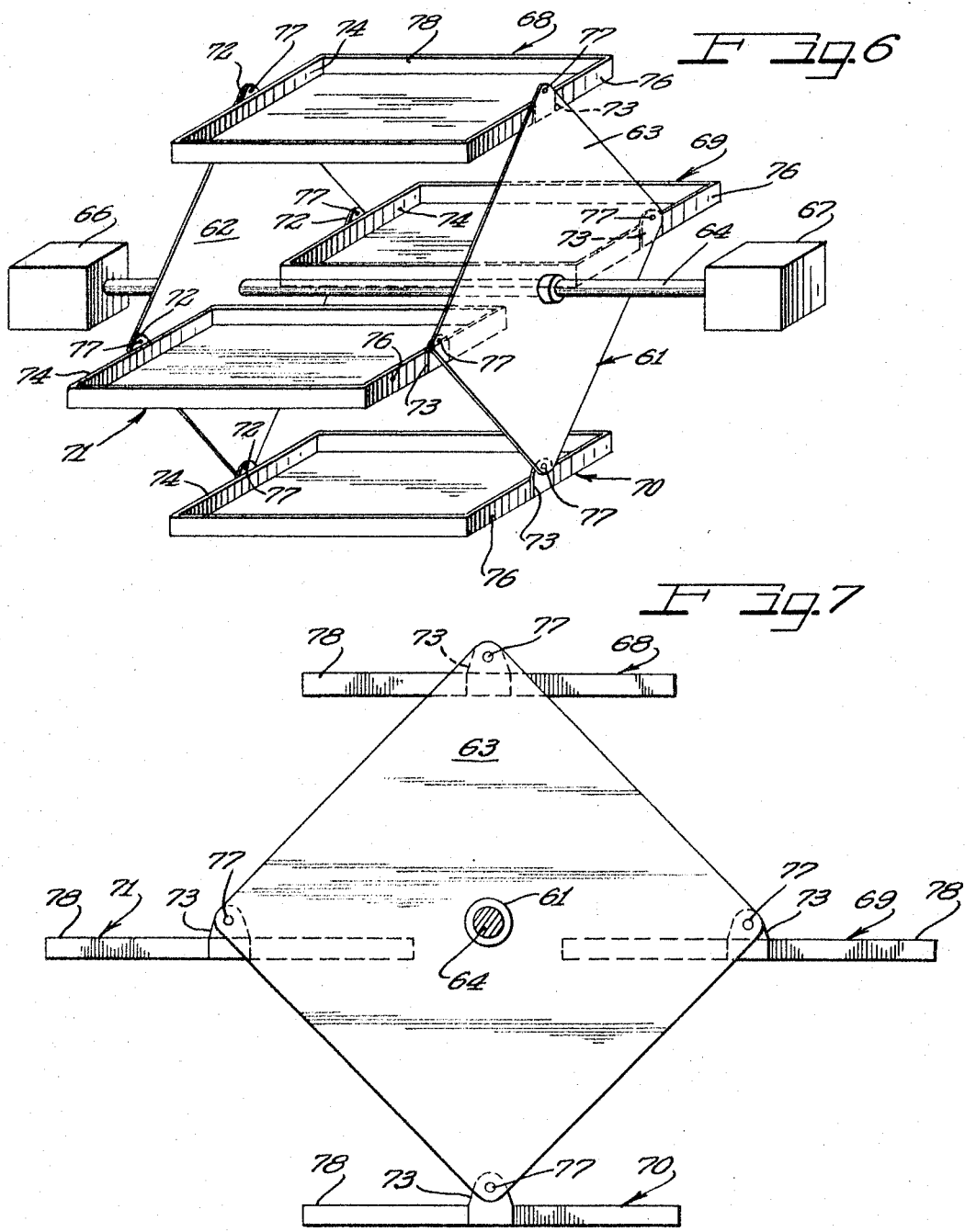

United States Patent Office 3,464,768
Patented Sept. 2, 1969

3,464,768
MULTI-SIZE SHEET FILM FEEDING MAGAZINE
FOR PHOTOGRAPHIC APPARATUS
Leonard S. Florsheim, Jr., Lake Forest, and Frederick
W. Hacker, Clarendon Hills, Ill., assignors to Robertson
Photo-Mechanix, Inc., Des Plaines, Ill., a corporation
of Illinois
Filed Sept. 30, 1966, Ser. No. 583,394
Int. Cl. G03b 27/60
U.S. Cl. 355—73        14 Claims

ABSTRACT OF THE DISCLOSURE

A photographic apparatus including multi-sided or multi-tray sheet-carrying cassettes. A vacuum back is sequentially movable relative to the cassettes for feeding sheets of different sizes in successive photographic operations from a particular cassette to a camera assembly.

The present invention relates generally to photographic equipment and more particularly to photographic apparatus adapted to project aerial images on individual sheets of photosensitized material and including a sheet supply station having multiple sheet carrying magazines adapted to accommodate sheets of different sizes for preselected use in successive photographic operations whereby in one operation an image can be formed on a sheet of a given size and in another operation a different sized sheet can be used.

In order to increase productivity, modern photographic equipment such as graphic arts camera assemblies have been automated, however, only one size of film may be used under any selected set of operating conductors.

However, since the sizes of film sheets desired in successive photographic operations may vary it is contemplated by the present invention to have available in an automatic graphic arts camera supplies of sheets of different sizes and means for preselectively changing the feed of such sheets to the cameras.

An embodiment of the invention illustrated and described herein comprises a plurality of cassettes or photosensitized sheet holders or trays which are mounted in circumferentially spaced relation on a rotatable frame assembly to move at the direction of the equipment operator through a preselected point in a circular path. A vacuum back assembly is associated with the frame-mounted cassettes and comprises a vacuum back or piston equipped with vacuum-biased holding surface and movable to one position to pick-off a single photosensitized sheet from a cassette located at the preselected point and capable of holding the sheet on the vacuum back as it is moved to another position at the focal plane in the optical track of a camera for exposure. It will thus be appreciated that by loading the respective cassettes with sheets of different sizes, the operator can by preselection take photographs on different sized sheets in successive photographic operations.

Thus an object of the invention is to provide photographic apparatus with plural sheet-carrying cassettes and means for moving relatively the cassettes and/or film holder sequentially to a preselected position for cooperation with a film holder such as a vacuum back or platen, as a result of which sheets of different sizes can be fed in successive photographic operations to the camera assembly. The invention affords greater flexibility in the photographic capabilities of the apparatus, increases productivity and reduces photographing expense in making it possible for improved operation without operator skill.

Another object of the invention is to confer multi-size sheet capabilities while minimizing the requirements of the photographic apparatus in terms of overall size.

Yet another object of the invention is to confer upon a vacuum type sheet form retaining means transportable between a loading station and an exposure station the ability to receive and retain sheets of different sizes during successive movements to the loading station.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

In the drawings:

FIGURE 3 is a perspective view of one embodiment of a cassette assembly constructed in accordance with the principles of the present invention;

FIGURE 4 is a fragmentary vertical sectional view of the side wall of a cassette taken along lines IV—IV of FIGURE 3;

FIGURE 5 is a perspective view of another embodiment of a cassette assembly with portions of an enclosure shown in dashed lines and with certain operating mechanisms indicated partially schematically;

FIGURES 6 and 7 are, respectively, perspective and side elevational views of yet another embodiment of a cassette assembly embodying the principles of this invention.

As shown on the drawings:

Figure 1:
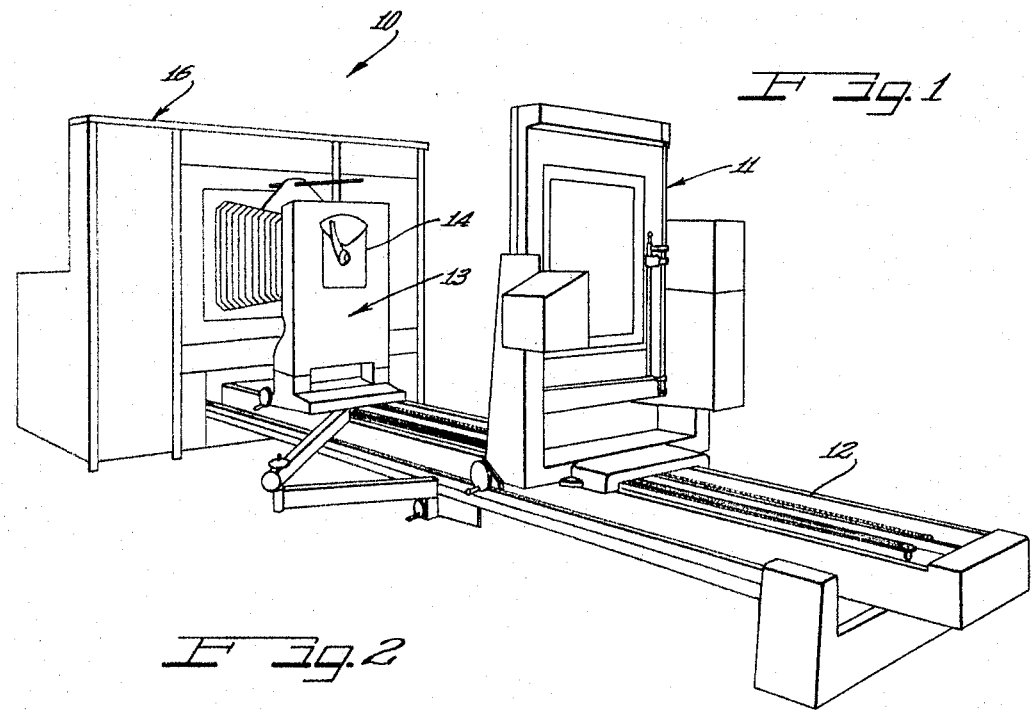
FIGURE 1 is a perspective view of photographic apparatus incorporating the principles of the present invention.

In FIGURE 1, photographic or other reproducing apparatus such as a graphics art camera in which the present invention finds particular utility is shown generally at 10 and comprises a copy board 11 movable on a track 12 for positioning an object or subject to be reproduced in alignment with the lens system of a camera structure 13. The camera structure 13 includes a lens system and shutter mechanism 14 which may be of any suitable type for focusing on the sensitized paper or other material at the focal plane of an optical track an image of the object or subject carried by the copy board as understood by those skilled in the art.

Situated on the side of the camera structure 13 opposite the copy board 11 is a storage supply station 16 comprising a light-tight enclosure housing a supply of photo-sensitized sheets used in the photographic process. The enclosure is more particularly characterized as comprising a front wall 17 facing the camera structure 13, a spaced parallel back wall 18 and transversely extending side walls 19 and 20.

A cassette assembly including a mounting frame indicated generally at 21 is located within the storage supply station 16 and comprises a shaft 22 suitably journalled for rotation as, for example, by means of bearing blocks mounted on the side walls 19 and 20.

Figure 2:
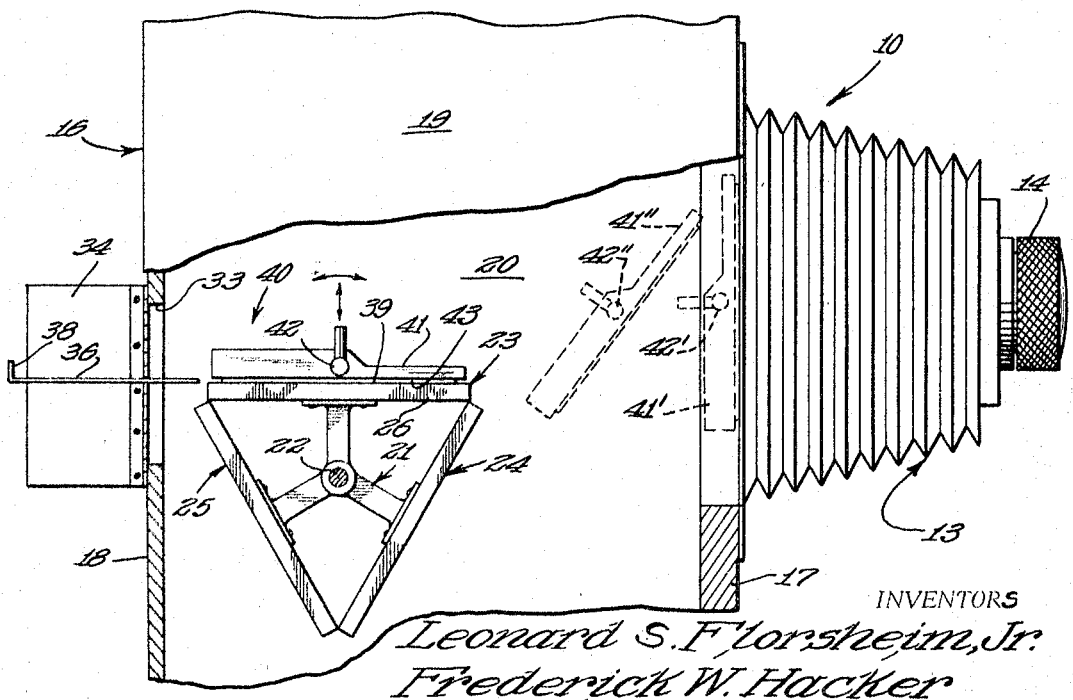
FIGURE 2 is an enlarged fragmentary vertical side view in elevation of a storage supply station of the apparatus shown in FIGURE 1 with a portion of a wall member cut away to show the relative disposition of parts.

In the embodiment of the cassette assembly shown in FIGURES 2 and 3, plural cassettes 23, 24 and 25 are mounted in fixed assembly on the rotatable frame 21 in circumferentially spaced relation each of the cassettes 23–25 comprises a flat bottom wall 26 extending in parallel relation to the axis of rotation of the frame 21, a pair of upstanding side walls 27 and 28 and front and back walls 29 and 30, respectively. The bottom wall 26 is secured by suitable means to radial brackets 31 and 32 on the frame 21 or to similarly suitable parts of the frame.

A total of three cassettes are included in the assembly shown in FIGURES 2 and 3 extending at angles of 60° to each other to provide a triangularly-shaped cross-section. The principles of the invention are not limited to any particular number of cassettes, however, and find utility in any photographic operation wherein more than one size of photosensitized sheets may be desired.

A stack of one of different sized sheets may be loaded into the respective cassettes 23–25 through an opening 33 formed in the back wall 18 of the storage station 16, a hinge-mounted door 34 being provided to maintain the interior of the enclosure 16 in a darkened condition as will be understood by the skilled worker in the art. Radially outwardly facing sides 39 of the cassettes 23–25 are selectively opened and closed by a dark slide 36 which operates as a removable cover plate. In loading the cassettes the sheets can be placed directly on the bottom walls 26 thereof.

The shaft 22 can be rotated either manually or by any suitable power operated mechanism. As the shaft is rotated, the cassettes 23–25 are moved through a circular path of travel into an inverted and an uprighted position through each revolution of the shaft.

In order to mount the cover plates or dark slides 36, the walls 27, 28 and 30 of each of the cassettes have grooves 37 formed therein into which the cover plate 36 easily slides, and the front wall 29 of each of the cassettes is slightly undercut to a point below the grooves 37 to accommodate insertion of the cover plate 36. An upturned handle 38 is formed on the outer ends of each of the cover plates to facilitate removal thereof during loading of the cassettes. A catch or the like device is provided on each cassette to prevent inadvertent removal of the cover plates 36 upon rotation of the shaft 22.

The cassettes 23–25 successively pass through a preselected point as the shaft 22 is rotated which point, in the embodiment shown in FIGURES 2 and 3, may correspond with the illustrated position of the cassettes 23 wherein the bottom wall 26 thereof extends horizontally and the radially outwardly facing open side 39 thereof faces vertically upwardly.

The individual sheets of photosensitized material are removed from the cassettes 23–25 by means of a vacuum back assembly indicated generally at reference numeral 40 and more particularly characterized as comprising a vacuum platen 41 mounted on a rotatable and elevatable shaft or the like mounting member 42. A flat apertured surface 43 is formed on the vacuum back or platen 41 and suitable source of vacuum bias such as a vacuum pump and a flexible hose are connected by means of grooves or recesses in the vacuum back or platen 41 to provide a suction bias across the face of the apertured plate 43. The surface 43 constitutes a working surface which is sized to have a dimensional extent larger or as large as the largest size sheet to be utilized in the multiple cassettes. If desired, the surface 43 may include a zoned pattern of apertures corresponding to different sized sheets.

The vacuum back 41 is movable from the position thereof shown in full lines in FIGURE 2 for picking up and retaining thereon a sheet of photosensitized material from an upwardly facing cassette (shown at 23 in FIGURE 2) to a position illustrated at dashed lines 41', at which position the sheet held thereon is in proper alignment with the force plane of the optical track with the camera structure 13 for exposure to the subject matter mounted on the copy board 11. By use of the term "aerial image" is meant any subject matter capable of being photographed whether two or three dimension. An intermediate position of the vacuum back disposed between the loading position 41 and the exposure position 41' is illustrated in dashed lines at 41''.

Any suitable transport mechanism is provided for moving the vacuum back 41 back and forth between the loading and exposure positions and means may also be provided as indicated schematically at reference numerals 44 and 46 for moving the shaft 22 vertically whereby a sheet of photosensitized material carried in the upper cassette 23 is engaged against the apertured vacuum plate 43 of the vacuum back 41.

In operation, sheets of different sizes are loaded in the cassettes 23–25 and a cover plate or dark slide 36 is then mounted on each cassette. After the operator determines the size of the sheet to be used in the succeeding photographic operation or operations, the shaft 22 is rotated unttil the particular cassette carrying sheets of the desired size is moved to the top horizontal position assumed by the cassette 23 in FIGURE 2. The cover plate or dark slide 36 of the upper cassette is then removed and the vacuum back 41 is moved to its loading position to pick a single sheet off the cassette and to move it to the exposure position. When a sheet or sheets of a different size are desired, the cover plate 36 is replaced on the top cassette and the shaft 22 is turned until the cassette carrying sheets of the desired size are in proper position to be acted upon by the vacuum back 41.

In the embodiment shown in FIGURE 5, wherein parts similar to those shown in FIGURES 2–4 are indicated by similar reference numerals, the individual cassettes 23–25 are disposed on the frame 21 with the open sides 39 thereof facing radially inwardly (in contrast with the embodiment shown in FIGURES 2–4) and are slidably carried in a corresponding plurality of individual drawers or casings 47–49 mounted in fixed assembly on the frame 21.

In this embodiment, as in the embodiment shown in FIGURES 2–4, the frame 21 is triangularly shaped in cross-section and three cassettes are mounted thereon at 60° angles to each other. Other cross-sections of the frame 21 are feasible, of course, along with a corresponding change in the total number of cassettes.

In the embodiment of FIGURE 5, the preselected point in the path of travel of the cassettes 23–25 at which the sheets carried thereby are picked-off by the vacuum back 41 is beneath the shaft 22 at which point the cassettes extend horizontally with the open sides 39 thereof facing vertically upwardly.

The casings 47–49 each comprise a pair of spaced parallel flat walls 50 and 51 and transverse side walls 52 and 53 and when the respective cassettes are in an inserted position within their casings, the sheets carried thereby are prevented by the walls of the casings from falling from the cassettes upon inversion thereof as the shaft 22 is rotated.

In operation, the particular cassette which carries sheets of the size to be next used is moved by rotating the shaft 22 until it assumes a position at the bottom of the frame 21 similarly to the position of the casing 47 in FIGURE 5. The cassette is then stopped in this position and suitable means as shown schematically at reference numeral 54 are provided to remove the selected cassette from its casing into axially offset relation with respect to the frame 21. To facilitate removal of the cassette the operating means 54 may include a reciprocable linkage at 56 adapted to grasp a ring or the like element 57 connected in fixed assembly to the wall 28 of the cassette. A pair of spaced parallel guide flanges 58 and 59 are disposed in aligned relation with the side walls 52 and 53 of a casing as it assumes the cassette-removal position thereof in order to guide and support the cassette as it is removed from the casing to the offset position shown in FIGURE 5.

After the cassette is removed, the vacuum back 41 is moved by any suitable operating means indicated schematically at reference numeral 60 from a position spaced axially with respect to the frame 21 as shown in FIGURE 5 vertically downwardly to a vacuum-biasing sheet engaging position to pick a sheet off of the removed cassette and then to an exposure position similar to the position shown at 41' in FIGURE 2.

In the embodiment shown in FIGURES 6 and 7, the cassettes are pivotally mounted on a rotatable frame in the manner of a ferris wheel. The frame is indicated generally at reference numeral 61, and comprises a pair of a end plates 62 and 63 mounted for corotation on a shaft 64 which is journalled at opposite ends by means of a pair of bearing blocks 66 and 67 mounted within the storage supply station or housing 16.

In this embodiment, a total of four cassettes 68-71 are pivotally suspended between the plates 62 and 63 in circumferentially spaced relation. A pair of upright brackets 72 and 73 are connected to side walls 74 and 76 of each of the cassettes to receive pivot pins 77, 77 extending axially inwardly from the end plates 62 and 63.

In this embodiment the cassettes 68-71 remain upright under the influence of gravitational bias as they are moved around the shaft 64, that is, with an open side 78 thereof always facing vertically upwardly, and it is not necessary to cover the tops of the cassette with removable cover plates. The associated vacuum back can be arranged to pick-off the sheets of photosensitized material at any position of the cassettes but the top position at which cassette 68 is shown may be preferred.

In this embodiment as well as in the embodiments of FIGURES 2-4 and FIGURE 5, the rotatable shaft upon which the cassettes are mounted is journalled for rotatable movement only, and the vacuum back 41 is arranged to move vertically downwardly into vacuum-biasing engagement with the cassette situated at the pick-off position. It will be appreciated, however, that the vacuum back can be arranged to move into vertically spaced relation with the cassettes in their pick-off position and the rotatable cassette-carrying shaft can be arranged to move vertically to raise the cassettes into vacuum-biasing engagement with the vacuum back.

Although minor modifications might be suggested by those versed in the art, it should be understood that we wish to embody within the scope of the patent warranted hereon all such modifications as reasonably come within the scope of our contribution to the art.

We claim as our invention:

1. In a photographic apparatus, the combination comprising:
   a camera assembly having a lens system,
   a plurality of cassettes each adapted to receive and carry a supply of differently sized sensitized sheet-form material,
   rotatable frame means mounting said cassettes for travel through a circular path,
   a movable vacuum back having a working surface at least as large as the largest sized sheet form material, and
   means for moving said vacuum back relative to said frame between a first position wherein said vacuum back operatively engages the sheet-form material carried in a selected cassette disposed at a preselected point in said path and a second position to position the selected sheet of the material for exposure in the camera assembly.

2. The combination as defined in claim 1 wherein said cassettes are connected in fixed assembly to said frame for corotation therewith.

3. The combination as defined in claim 2 wherein each of said cassettes comprises a flat sheet-carrying surface which extends parallel to the working surface of the vacuum back when its corresponding cassette is situated at said preselected point in said path.

4. The combination as defined in claim 1 wherein each of said cassettes comprises a flat sheet-carrying surface which remains horizontally disposed as its corresponding cassette is moved through its entire circular path of travel.

5. The combination as defined in claim 1 wherein said moving means comprises means for moving any one of said cassettes situated at said preselected point in said path axially relative to said frame and into axial registry with said vacuum back in said first position thereof.

6. The combination as defined in claim 2 including means effective to maintain the sheets of material on their respective cassettes in the inverted positions thereof as said cassettes are moved through a revolution of said circular path of travel.

7. The combination as defined in claim 1 wherein each of said cassettes comprises a flat sheet-carrying surface which extends horizontally and in substantially parallel relation to said vacuum back when its corresponding cassette is at said preselected point in said path of travel and said vacuum back is at said first position thereof.

8. The combination as defined in claim 4 including means mounting said cassettes for independent pivotal movement on said frame means on axes parallel to the axis of rotation of said frame means.

9. In photographic equipment, the combination comprising,
   a camera assembly,
   a magazine assembly in spaced relation to the camera assembly for storing a supply of photosensitized sheets of various sizes, and
   a vacuum back assembly for picking off individual sheets from the magazine assembly and positioning said sheets so as to receive a latent image projected by the camera assembly,
   said magazine assembly comprising,
      a frame rotatable on a horizontal axis,
      a plurality of axially extending sheet-carrying cassettes mounted in circumferentially spaced relation on said frame and movable upon rotation of said frame through a circular path,
      said cassettes each being mounted so as to be horizontally disposed at a preselected point in said path,
   said vacuum back assembly comprising,
      a vacuum back adapted to vacuum-bias individual sheets thereagainst, and
      means for moving said vacuum back between a first horizontally disposed position radially adjacent a cassette located at said preselected point to pick-off a sheet from said cassette and a second position at which the picked-off sheet is disposed to receive a latent image from the camera assembly.

10. The combination as defined in claim 9 in which said cassettes are pivotally mounted on said frame on axes parallel to the axis of rotation of said frame so as to remain in a horizontal position when moved through said circular path.

11. The combination as defined in claim 9 in which said cassettes are mounted in fixed assembly on said frame and are open at the radially outwardly facing sides thereof and including removable cover means for covering the open sides of said cassettes.

12. The combination as defined in claim 10 and including:
   a plurality of casings mounted in fixed assembly on said frame for carrying said cassettes, and
   means for moving said cassettes at said preselected point out of said casings and into axially offset relation with said frame,
said first position of said vacuum back being adjacent the axially offset position of said cassettes.

13. The combination as defined in claim 12 wherein said cassettes are open at the radially inwardly facing sides thereof.

14. The combination as defined in claim 12 and including:
guide means for guiding said cassettes into said axially offset relation with said frame.

References Cited

UNITED STATES PATENTS

| | | | |
|---|---|---|---|
| 2,112,838 | 4/1938 | Griffin | 88—24 |
| 3,208,335 | 9/1965 | Doherty | 88—24 |

NORTON ANSHER, Primary Examiner

R. A. WINTERCORN, Assistant Examiner

U.S. Cl. X.R.

355—76, 91